United States Patent
Hsu et al.

(10) Patent No.: US 12,013,730 B2
(45) Date of Patent: Jun. 18, 2024

(54) HINGE SYNCHRONIZATION MODULE

(71) Applicant: FOSITEK CORPORATION, New Taipei (TW)

(72) Inventors: An-Szu Hsu, New Taipei (TW); An-Wei Chung, Kaohsiung (TW); Wei-Chieh Chen, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/846,467

(22) Filed: Jun. 22, 2022

(65) Prior Publication Data

US 2023/0273649 A1 Aug. 31, 2023

(30) Foreign Application Priority Data

Feb. 25, 2022 (TW) .................................. 111106968

(51) Int. Cl.
| | |
|---|---|
| *G06F 1/16* | (2006.01) |
| *F16C 11/04* | (2006.01) |
| *E05D 3/12* | (2006.01) |
| *E05D 3/18* | (2006.01) |

(52) U.S. Cl.
CPC ............ *G06F 1/1681* (2013.01); *F16C 11/04* (2013.01); *E05D 3/122* (2013.01); *E05D 3/18* (2013.01); *E05Y 2900/606* (2013.01)

(58) Field of Classification Search
CPC ....... G06F 1/1681; G06F 1/1652; E05D 3/18; E05D 3/122; H04M 1/022; F16C 11/04
See application file for complete search history.

(56) References Cited

U.S. PATENT DOCUMENTS

| | | | | |
|---|---|---|---|---|
| 9,677,308 B1* | 6/2017 | Chen | .......................... | E05D 3/18 |
| 9,848,502 B1* | 12/2017 | Chu | ..................... | G06F 1/1681 |
| 10,983,569 B2* | 4/2021 | Lin | ..................... | G06F 1/1616 |
| 11,550,358 B2* | 1/2023 | Cheng | .................. | G06F 1/1681 |
| 11,698,665 B2* | 7/2023 | Hsu | ........................ | G06F 1/1681 |
| | | | | 16/233 |
| 11,744,030 B2* | 8/2023 | Zhang | .................. | G06F 1/1652 |
| | | | | 361/807 |
| 2021/0355988 A1* | 11/2021 | Cheng | .................. | G06F 1/1681 |

(Continued)

FOREIGN PATENT DOCUMENTS

CN 210007737 U 1/2020

OTHER PUBLICATIONS

Taiwanese Search Report for Taiwanese Application No. 111106968, dated Feb. 25, 2022.

*Primary Examiner* — Christine M Mills
*Assistant Examiner* — Matthew J Sullivan
(74) *Attorney, Agent, or Firm* — Birch, Stewart, Kolasch & Birch, LLP

(57) ABSTRACT

A hinge synchronization module includes a base unit, and two hinge units. The two hinge units are connected to the base unit, and each of the hinge units has a gear member, a rotating platform, and a connecting member. The gear members of the hinge units mesh with each other. The rotating platform of each hinge unit has a platform body pivotable relative to the base unit. The connecting member of each hinge unit has a gear part mashing with the gear member of the hinge unit, and a slide hole. A slidable rod of the rotating platform of each hinge unit is disposed in and slidable along the slide hole of the connecting member of the hinge unit.

5 Claims, 8 Drawing Sheets

(56) References Cited

U.S. PATENT DOCUMENTS

| | | | |
|---|---|---|---|
| 2022/0282754 A1* | 9/2022 | Zhang | F16C 11/04 |
| 2022/0400565 A1* | 12/2022 | Shin | G06F 1/1616 |
| 2023/0053947 A1* | 2/2023 | Liu | G06F 1/1652 |
| 2023/0103700 A1* | 4/2023 | Park | G06F 1/1652 |
| | | | 361/679.01 |
| 2023/0193947 A1* | 6/2023 | Park | G06F 1/1616 |
| | | | 361/807 |
| 2023/0213056 A1* | 7/2023 | Han | F16C 11/04 |
| | | | 455/575.3 |
| 2023/0217616 A1* | 7/2023 | Park | G06F 1/1679 |
| | | | 361/807 |
| 2023/0229189 A1* | 7/2023 | Li | F16H 1/22 |
| | | | 361/807 |
| 2023/0231941 A1* | 7/2023 | Jiang | H04M 1/022 |
| | | | 361/679.01 |
| 2023/0236635 A1* | 7/2023 | Liu | G06F 1/16 |
| | | | 361/679.21 |
| 2023/0296129 A1* | 9/2023 | Kim | H05K 5/0226 |
| | | | 361/807 |
| 2023/0300228 A1* | 9/2023 | Mody | H04M 1/022 |
| | | | 455/566 |

\* cited by examiner

HINGE SYNCHRONIZATION MODULE

CROSS-REFERENCE TO RELATED APPLICATION

This application claims priority to Taiwanese Invention Patent Application No. 111106968, filed on Feb. 25, 2022.

FIELD

The disclosure relates to a hinge mechanism, and more particularly to a hinge synchronization module for a flexible screen.

BACKGROUND

Referring to FIGS. 1 and 2, a conventional synchronized hinge mechanism is used to mount a flexible screen 91, and includes two rotating platforms 92 that can pivot between open and closed positions and a plurality of transmission gears 93 connected between two rotating axles 921 of the rotating platforms 92. FIG. 1 shows the rotating platforms 92 in the open position and FIG. 2 shows the rotating platforms 92 in the closed position. When the conventional synchronized hinge mechanism is in the closed position, there must be enough space for the flexible screen 91 to bend without cracking. Therefore, the rotating axles 921 of the two rotating platforms 92 must have more space between them by having more transmission gears 93 to synchronize pivoting the rotating platforms 92 between the open and closed positions.

However, by having more transmission gears 93 between the rotating platforms 92, tooth spacing tolerance between the transmission gears 93 will multiply and may cause the rotating platforms 92 to lose synchronization.

SUMMARY

Therefore, an object of the disclosure is to provide a hinge synchronization module that can alleviate at least one of the drawbacks of the prior art.

According to the disclosure, the hinge synchronization module includes a base unit, and two hinge units. The two hinge units are connected to the base unit and symmetrical about a central axis. Each of the hinge units has a gear member and a rotating platform that are respectively adjacent to and distal from the axis, and a connecting member that interconnects the gear member and the rotating platform. The gear members of the hinge units are rotatably connected to the base unit, and mesh with each other. The rotating platform of each hinge unit has a platform body, a rotating joint that is connected to the platform body and that is rotatably connected the base unit such that the platform body is pivotable relative to the base unit, and a slidable rod that is connected to the platform body, that is parallel to the rotating joint, and that is comparatively more proximate to the gear member of the hinge unit than the rotating joint. The connecting member of each hinge unit is pivotally connected to the base seat, has a gear part that meshes with the gear member of the hinge unit, and a slide hole. The slidable rod of the rotating platform of the hinge unit is disposed in and slidable along the slide hole. The rotating platform of the hinge units is synchronously pivotable to open and close via the gear member and the connecting member, while the slidable rods of the rotating platforms of the hinge units slide respectively along the slide holes of the connecting members of the hinge units.

BRIEF DESCRIPTION OF THE DRAWINGS

Other features and advantages of the disclosure will become apparent in the following detailed description of the embodiment with reference to the accompanying drawings, of which

DETAILED DESCRIPTION

Figure 1:
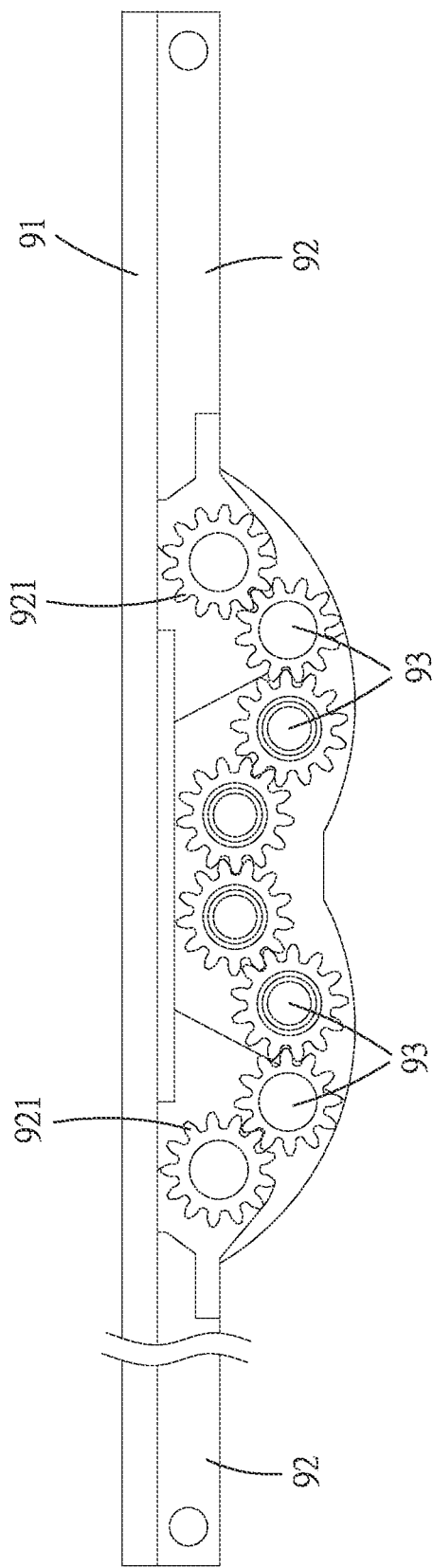
FIG. 1 is a fragmentary schematic side view illustrating a conventional synchronized hinge mechanism in an open position.
Figure 2:
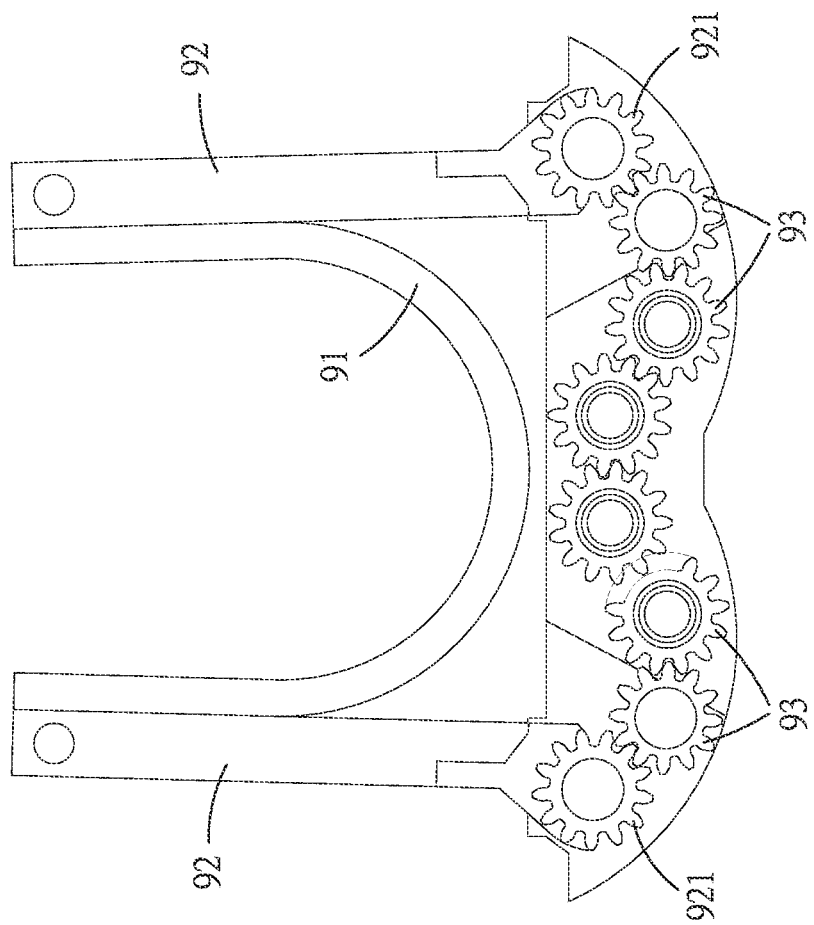
FIG. 2 is a schematic side view illustrating the conventional synchronized hinge mechanism in a closed position.
Figure 3:
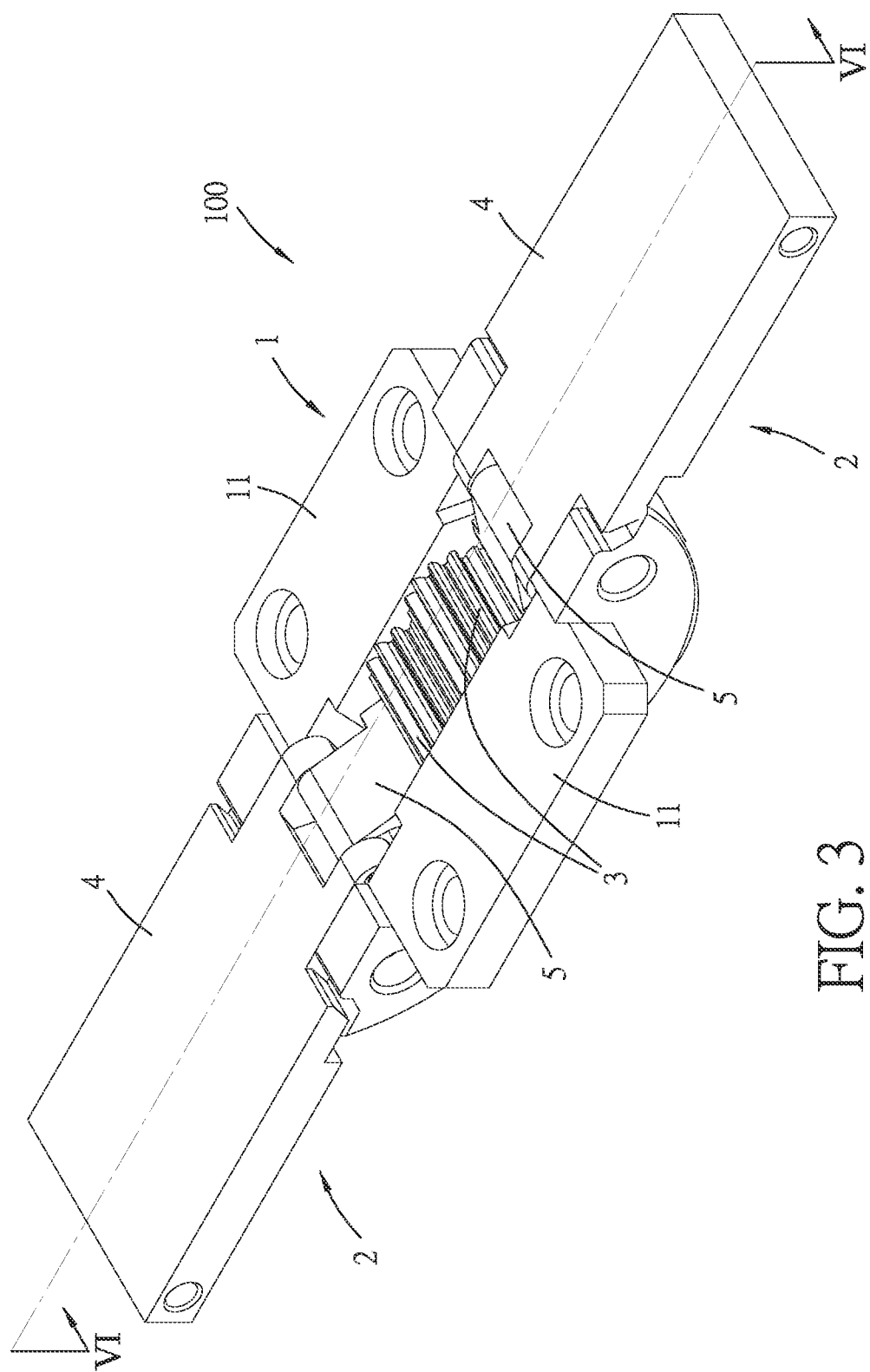
FIG. 3 is a perspective view illustrating an embodiment of a hinge synchronization module according to the disclosure.

Referring to FIGS. 3 to 6, an embodiment of a hinge synchronization module 100 according to the present disclosure is shown. The hinge synchronization module 100 includes a base unit 1, and two hinge units 2.

In this embodiment, the base unit 1 includes two support members 11 that are spaced apart from each other, and the hinge units 2 are positioned between the support members 11.

The two hinge units 2 are connected to the base unit 1 and symmetrical about a central axis (A), each of the hinge units 2 has a gear member and a rotating platform 4 that are respectively adjacent to and distal from the axis (A), and a connecting member 5 that interconnects the gear member 3 and the rotating platform 4.

The gear members 3 of the hinge units 2 are rotatably connected to the base unit 1, and mesh with each other.

The rotating platform 4 of each hinge unit 2 has a platform body 41, a rotating joint 42 that is connected to the platform body 41 and that is rotatably connected to the base unit 1 such that the platform body 41 is pivotable relative to the base unit 1, and a slidable rod 43 that is connected to the platform body 41, that is parallel to the rotating joint 42, and that is comparatively more proximate to the gear member 3 than the rotating joint 42. The platform body 41 of the rotating platform 4 of each of the hinge units 2 has an accommodation slot 44. The slidable rod 43 of the rotating platform 4 of each of the hinge units 2 is disposed in the accommodation slot 44 of the platform body 41 of the rotating platform 4.

The connecting member 5 of each hinge unit 2 is pivotally connected to the base seat 1, and has a rod body 51, an extending body 52, a gear part 53, and a slide hole 54. The rod body 51 extends in a direction of the axis (A), and is formed with the gear part 53. The extending body 52 extends from the rod body 51, and is formed with the slide hole 54. The extending body 52 is inserted into the accommodation slot 44 of the platform body 41 of the rotating platform 4, and the slide hole 54 is elongated in a direction perpendicular to a direction of the axis (A). The gear part 53 meshes with the gear member 3 of the hinge unit 2, and the slidable rod 43 of the rotating platform 41 of the hinge unit 2 is disposed in and slidable along the slide hole 54. In this embodiment, the slide hole 54 has two opposite ends in the direction perpendicular to the direction of the axis (A) that are configured as closed ends. However, in other embodiments, the slide hole 54 may be formed with a U-shaped opening.

Figure 4:
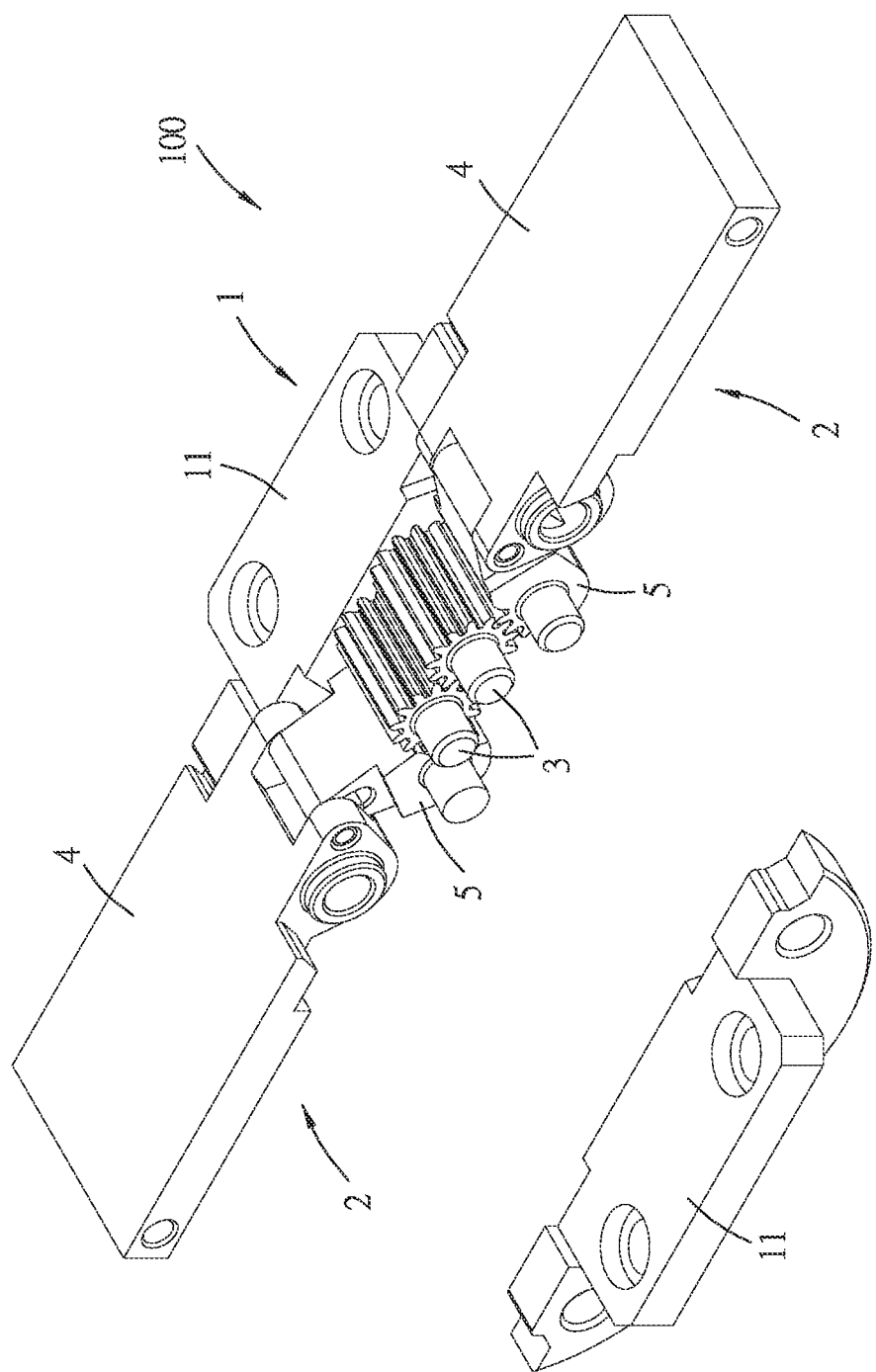
FIG. 4 is a partially exploded perspective view of the embodiment.
Figure 5:
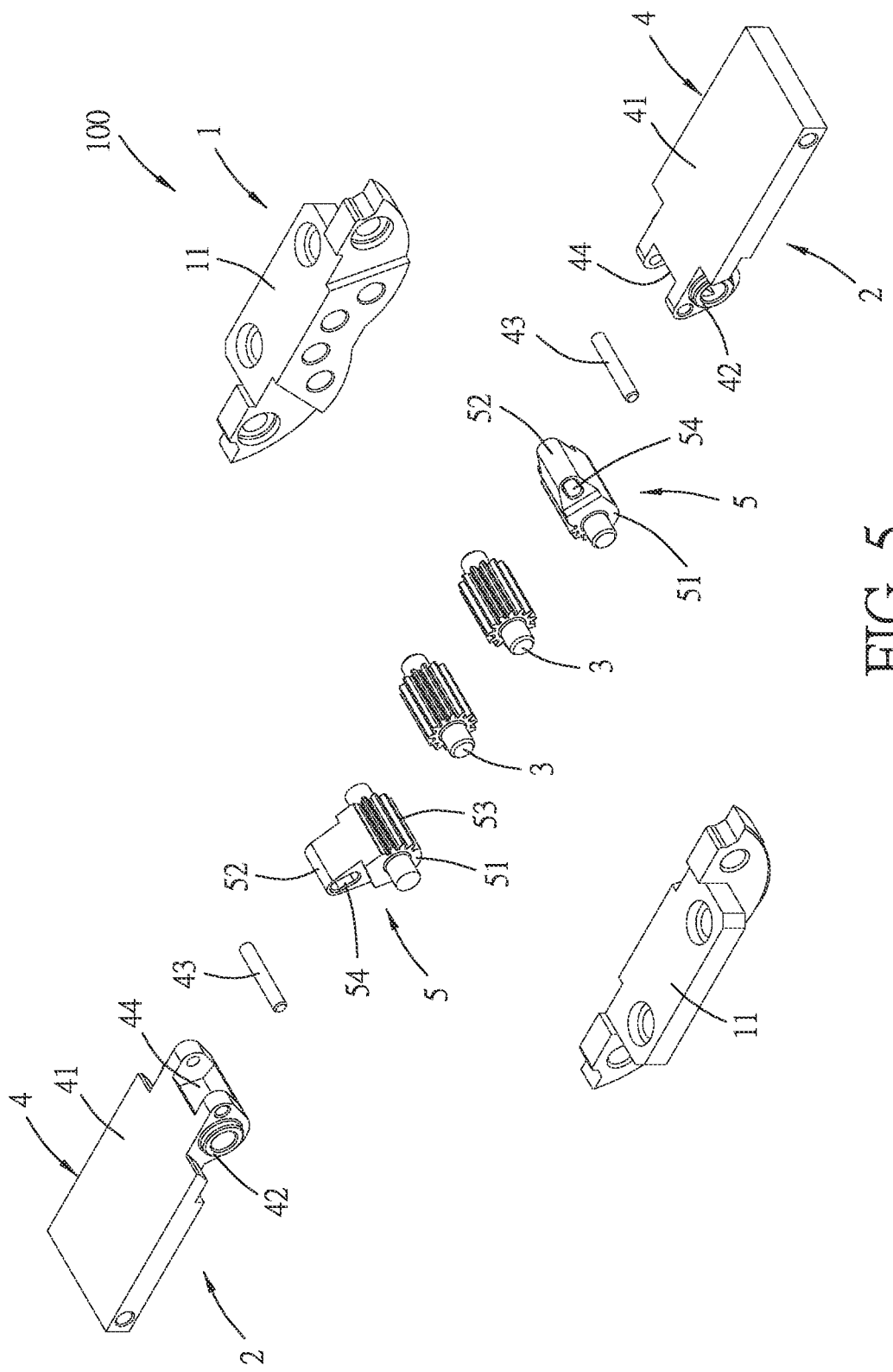
FIG. 5 is an exploded perspective view illustrating the embodiment.
Figure 6:
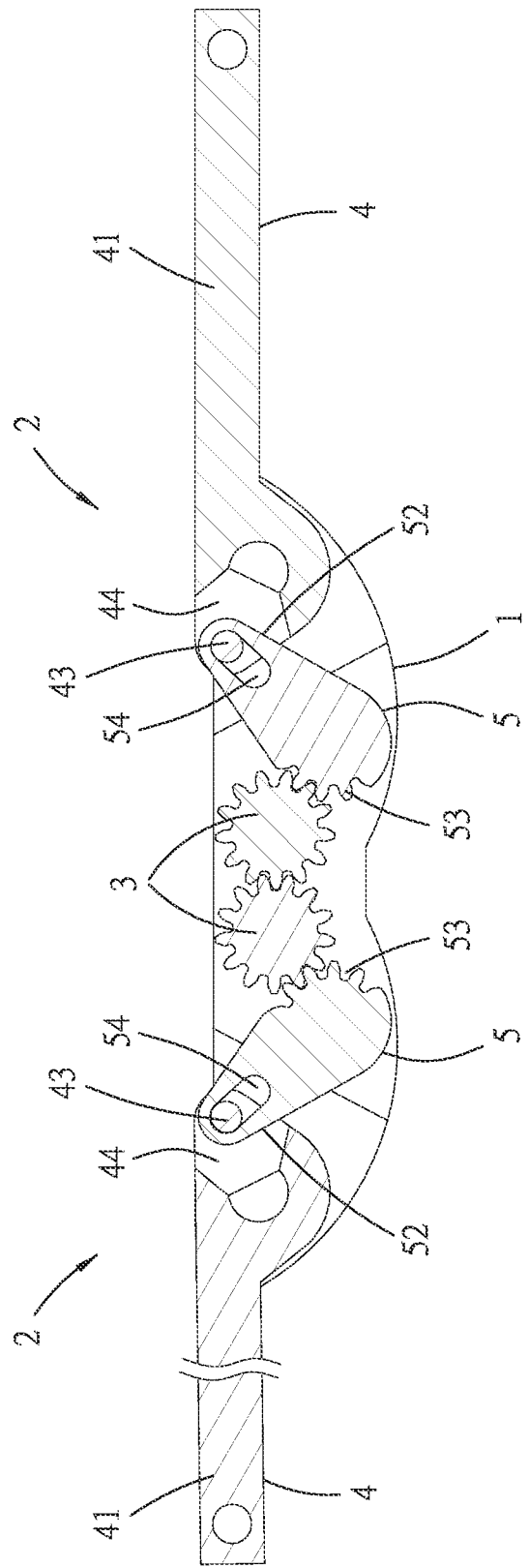
FIG. 6 is a fragmentary sectional view illustrating the embodiment in an open state.
Figure 7:
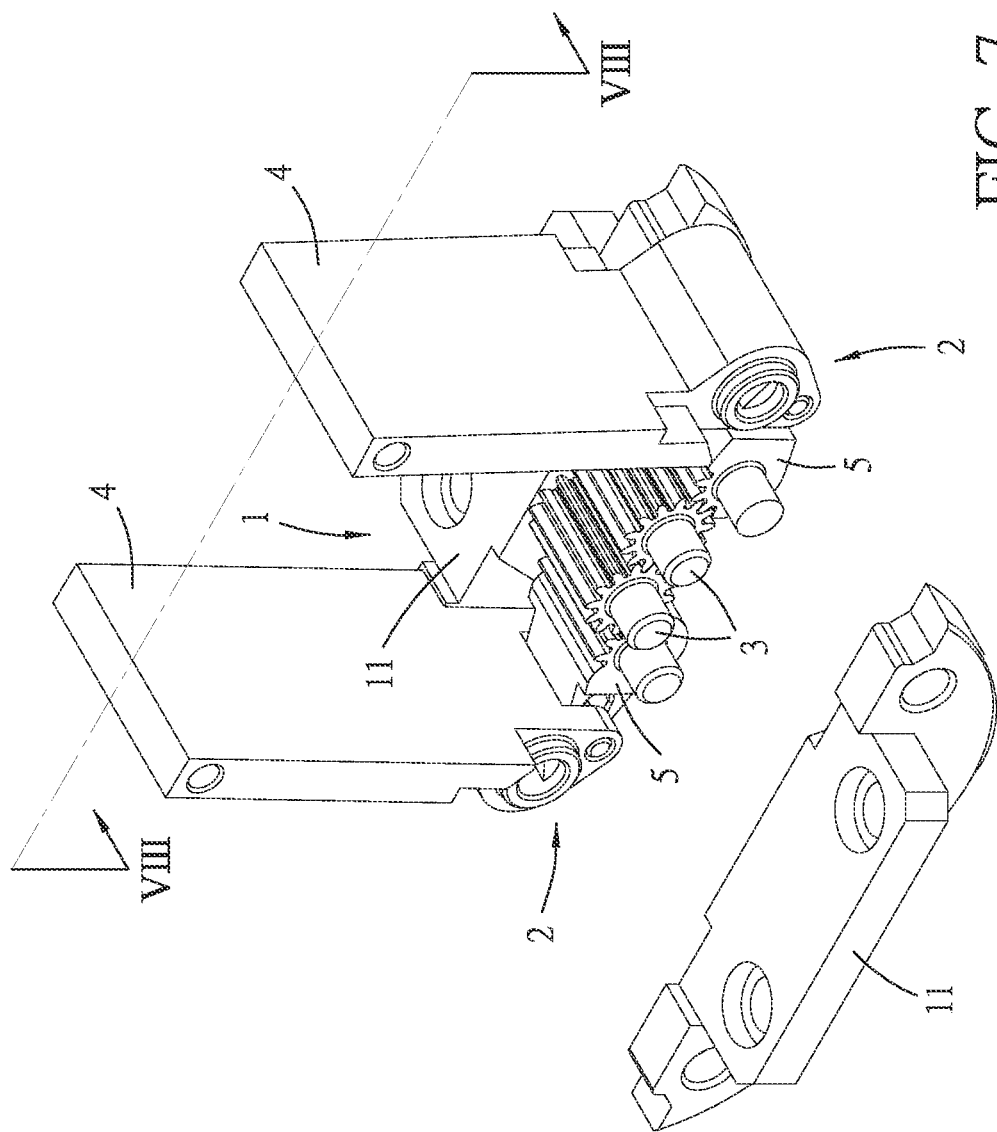
FIG. 7 is a partially exploded perspective view illustrating the embodiment in a closed state.
Figure 8:
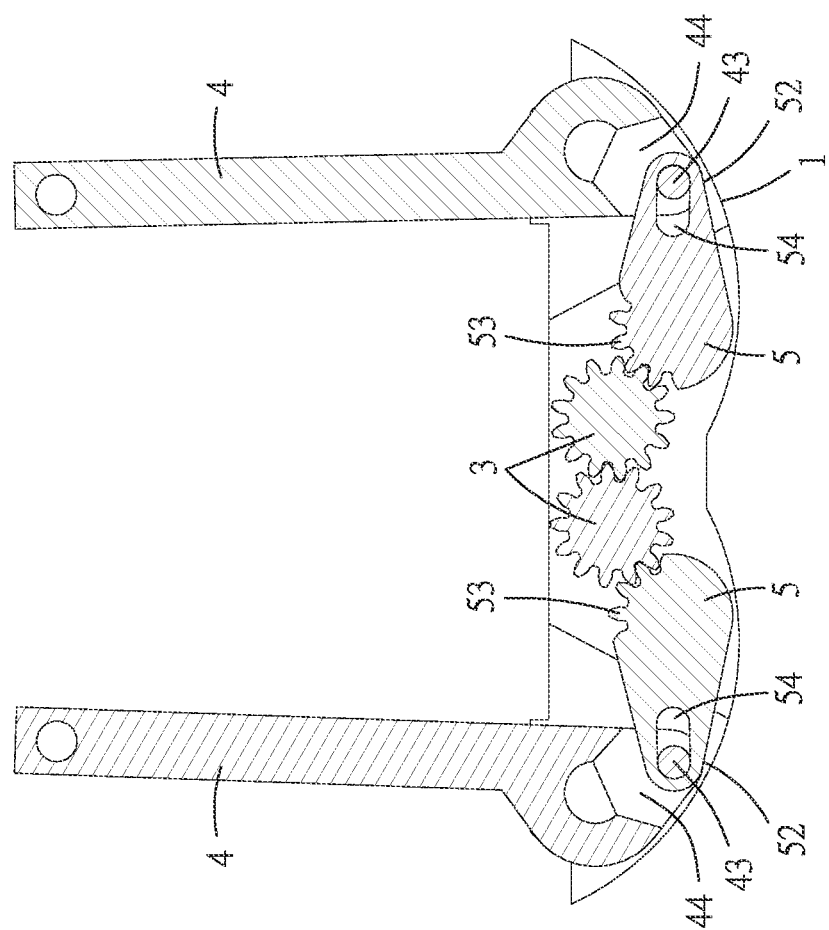
FIG. 8 is a sectional view illustrating the embodiment in the closed state.

Referring to FIGS. 4, 6, 7 and 8, the rotating platforms 4 of the hinge units 2 are synchronously pivotable to open and close via the gear members 3 and the connecting members 5. FIGS. 4 and 6 show the rotating platforms 4 in an open state, and FIGS. 7 and 8 show the rotating platforms 4 in a closed state. When the rotating platforms 4 are pivoted between the open and closed states, the slidable rods 43 of the rotating platforms 4 of the hinge units 2 slide respectively along the slide holes 54 of the connecting members 5 of the hinge units 2. In this embodiment, when the rotating platforms 4 pivot from the open state to the closed state, the slidable rods 43 first slide from an outward position to an inward position along the slide holes 54 (i.e., slides toward the axis (A)). The slidable rods 43 reach the inward position when the rotating platforms 4 are pivoted 45 degrees from the open state. Then, as the rotating platforms 4 continue to pivot to the closed state, the slidable rods 43 slide from the inward position back to the outward position (i.e., slides away from the axis (A)).

In the hinge synchronization module according to the present disclosure, by virtue of only having the gear parts 53 of the connecting members 5 mesh with the gear members 3 between the two hinge units 2, the requirement to have additional gears between the two hinge units 2 can be eliminated without affecting the ability of the rotating platforms 4 to pivot synchronously. By eliminating superfluous gears, tooth spacing tolerance will not accumulate and synchronized pivoting of the rotating platforms 4 between the open and closed states will not be affected. Additionally, the length of the connecting members 5 may be adjusted according to the distance between the gear members 3 and the rotating platforms 4, thereby providing a greater range of design options for the hinge synchronization module.

In summary, in the hinge synchronization module 100 according to the present disclosure, by virtue of having the rotating platforms 4 of the hinge units 2 being synchronously pivotable to open and close via the gear members 3 and the connecting members 5, tooth spacing tolerance accumulation of having multiple gears may be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hinge synchronization module, comprising:
a base unit; and
two hinge units connected to said base unit and symmetrical about a central axis, each of said hinge units having a gear member and a rotating platform that are respectively adjacent to and distal from the axis, and a connecting member that interconnects said gear member and said rotating platform;
wherein said gear members of said hinge units are rotatably connected to said base unit, and mesh with each other;
wherein said rotating platform of each hinge unit has
a platform body,
a rotating joint that is connected to said platform body and that is rotatably connected to said base unit such that said platform body is non-eccentrically pivotable relative to said base unit, and
a slidable rod that is connected to said platform body, that is parallel to said rotating joint, and that is comparatively more proximate to said gear member of said hinge unit than said rotating joint;
wherein said connecting member of each hinge unit is pivotally connected to said base unit, and has a gear part that meshes with said gear member of said hinge unit, and a slide hole, said slidable rod of said rotating platform of said hinge unit being disposed in and slidable along said slide hole; and
wherein said rotating platforms of said hinge units being synchronously pivotable to open and close via said gear members and said connecting members, while said slidable rods of said rotating platforms of said hinge units slide respectively along said slide holes of said connecting members of said hinge units.

2. The hinge synchronization module as claimed in claim 1, wherein said connecting member of each of said hinge units further has:
a rod body that extends in a direction of the axis, and that formed with said gear part; and
an extending body that extends from said rod body, and that is formed with said slide hole.

3. The hinge synchronization module as claimed in claim 2, wherein:
said platform body of said rotating platform of each of said hinge units has an accommodation slot;
said slidable rod of said rotating platform of each of said hinge units is disposed in said accommodation slot of said platform body of said rotating platform; and
for each of said hinge units, said extending body of said connecting member is inserted into said accommodation slot of said platform body of said rotating platform.

4. The hinge synchronization module as claimed in claim 1, wherein said base unit includes two support members that are spaced apart from each other, and said hinge units are positioned between said support members.

5. The hinge synchronization module as claimed in claim 1, wherein, for each of said hinge units, said slide hole is elongated in a direction perpendicular to a direction of the axis.

* * * * *